Patented Apr. 24, 1923.

1,453,185

UNITED STATES PATENT OFFICE.

PAUL EMMANUEL HIPPOLYTE ROUSSAN, OF PARIS, FRANCE.

APPLICATION OF THE BARK (SUBER) OF MELALEUCA LEUCADENDRON TO THERMIC, HYDRAULIC, AND DIELECTRIC DEVICES.

No Drawing.   Application filed August 23, 1920.   Serial No. 405,310.

*To all whom it may concern:*

Be it known that I, PAUL EMMANUEL HIPPOLYTE ROUSSAN, a citizen of the French Republic, and resident of Paris, France, have invented certain new and useful improvements in application of the bark (suber) of *Melaleuca leucadendron* to thermic, hydraulic, and dielectric devices, of which the following is a specification.

The Melaleuca are trees of the family of the Myrtaceae which, when growing in the woods, attain a diameter of from 20 to 40 centimeters and a height of stem of 3, 5 and even 8 meters; when growing isolatedly in particular grounds, they attain still greater dimensions.

The Melaleuca are common in Australia, in South China, where they are called "niaouli," "tram" or "tramé."

Now the present invention concerns the uses of the bark of said tree:

1.—As a nonconducting material applicable to the various thermic devices (heat or cold).

2.—As an hydraulic lighter (cofferdam, stoppers and the like);

3.—As a dielectric.

This bark, about 10 to 15 millimeters thick, is formed by series of thin superposed sheets at the rate of 10 sheets to a millimeter, stuck together by a very small quantity of a resinous substance and by white deposits of carbonate and oxalate of lime.

The reduction or separation of said substances is easy, either by a mechanical action, or under the action of wet steam or by plunging same in a slightly alkaline water and then into a slightly acid solution. The resinous substance is first attacked by the alkali, then the carbonate and the oxalate of lime are decomposed by the acidulated water.

The first time the bark of Melaleuca is removed from the tree, it is from 10 to 15 millimeters thick, the second and the further crops (a crop every five years) give a higher product.

The specific gravity of Melaleuca bark is about 0.18 to 0.20, the specific gravity of usual cork being 0.24 to 0.26; thus the Melaleuca bark is 25% lighter than cork.

Owing to its foliated constitution, the Melaleuca bark is more compressible (without becoming torn) than the cork; it may even give way to particular gaufferings or the like at high as well as at low temperatures.

It absorbs the moisture just like the cork when the sap ducts are not obstructed; however the least coating or paraffining of the edges diminish to a great extent its hygrometric properties.

A number of patterns of Melaleuca bark and a number of cork strips have been submitted to the action of the chemical ingredients decomposing same, such as: more or less concentrated dissolutions of sulphuric acid, hydrochloric acid, nitric acid, alkaline solutions, gaseous chlorine and the like.

The resistance of the Melaleuca suber is at least comparable to that of cork at any point of view.

The lamellated structure and the presence of carbonate and oxalate of lime provide a great resistance against the passage of the calories.

The experiments on a steam pipe of 8 centimeters diameter at a temperature of 180 degrees C. have proved:

| Thickness of the covering of Melaleuca cork. | Temperature C. | | | Economy of steam. |
|---|---|---|---|---|
| | Inner. | Outer. | Difference. | |
| | *Degrees.* | *Degrees.* | *Degrees.* | *Per cent.* |
| 5 millimeters | 180 | 70 | 110 | 61.111 |
| 10 millimeters | 180 | 60 | 120 | 66.657 |
| 15 millimeters | 180 | 40 | 140 | 77.773 |

When the coefficient of conductibility of cork (Bourdon cork), when freshly applied, is $C=0.072$ that of the Melaleuca cork is $C=0.0514$.

This latter is nearly equal to the coefficient of the plaited or tressed silk waste, which is $C=0.0434$.

This tressed silk waste is the best of all insulating materials, but it is the most expensive.

Experiments have been made:

1. On an engine called "little horse Belleville" running under a pressure of 11 kilos;

2. On a pipe of 8 centimeters diameter through which was flowing steam at a pressure of 7 kilos (engine Weyer and Richmond);

3. On a steam drying apparatus of a

Westinghouse machine at a pressure of 10 kilos;

4. During several years on steam ducts of a factory (particular service of the city of Paris), with high pressure steam—150 H. P.—18 hours daily.

After three years, the state of conservation and adherence were the same as the first day. A withdrawing and a putting again in its place, at another place, could be done without any difficulty.

A peculiarity was revealed at this occasion: Owing to the contact with the hot walls, the first layer was transformed into a kind of varnish, a layer which only could increase the insulating power, the metal of the pipe having remained intact.

Its suppleness, the faculty to get strips or sheaths and plates of any desired dimensions by superposing or juxtaposing, allow of the material being readily and quickly put in place. Use may be made of ties, wire, wire gauze frames and the like and preferably rolling strips or bent sheaths laced round boot maker hooks or the like. The elbows are laced in the same way after radial incisions have been made.

For large wooden, metal or cement walls it may be applied in the shape of sheaths, padding, lists or the like.

It is easily applied and removed.

As to economy:

1. It is lighter than cork (0.18 instead of 0.24), so that the weight of Melaleuca to be used is smaller than that of cork.

2. It lasts at least three times more than cork;

3. It is more readily applied and removed.

Now, when multiplying the cost price by two, the resulting selling price of the novel insulating material is less cheaper than the cost price of cork.

The industry may be thus provided with a very cheap non-conductible material the properties of which correspond to the four required conditions: efficiency, durability, easy applying and low cost price.

It may further be stated that its existence on hundreds of square miles secures a regular supply upon the markets and it secures to the exportation a large traffic favourable to the change.

The product may be applied to frigorific or isothermic devices, such as: frigorific rooms of frigo steamers.

Frigorific docks and stores;

Frigorific or ice vehicles and railway carriages;

Ice rooms for meat shots, victual stores, pastrycook's shops, sherbet maker shops, ammunition wagons and the like; refrigerating boxes, refrigerating pipes, breweries, chaix, wine fermentation cellars, wine stores.

Its application is pretty easy in shape of panels filled with bark, the walls being made of wood, metal, armoured concrete and the like, or by stuffing same between said walls.

However as the required thickness is five times smaller than that of powdered cork and twice smaller than the cork plates, a much more considerable useful cube is got; the application may even be done outside the cooling chambers.

Said Melaleuca bark may also be applied to walls and roofs of houses as a heat regulator in the cold or hot countries.

The fragments or waste used as stuffing material request half the thickness of the cork powder.

Further applications may be considered, as for instance:

Manufacturing of colonial helms, made of natural strips. Resiliency could be provided by a convenient lacquering.

Insoles for the interior or legs for winter boots. (It would be necessary to border same and to provide lines of stitchings for securing the durability.)

Tool handles in shape of plates or moulded agglomerate for blow pipes, soldering lamps, box irons and the like.

The invention also relates to the uses in the marine department, as floats, cofferdams, lighters, and the like.

The low specific weight of the Melaleuca cork (0.18 to 0.20) and the easiness with which it may be applied allow of the same being used as a float, its ascensional power in water, and more particularly in sea water, being very high.

Effectively when dipping into water a block of one cubic decimeter of Melaleuca cork, into which is intercalated a square steel plate 10 centimeters long and 10 centimeters wide and one centimeter thick, it immediately floats, as shows the following calculation:

|  | Kgr. | Sea water. Kgr. |
|---|---|---|
| Weight of the steel plate | 0.780 | 1.025 |
| Weight of the Melaleuca cork | 0.180 |  |
|  | 0.960 | 0.960 |
| Difference |  | 0.065 |

This leads to the conclusion that the problem of the continuously floating of the ships becomes at least disputable, as it consists in reducing the specific gravity of the building and engine materials to a general specific gravity slightly less than one which is generally the gravity of wood, whereby the ship could float in case of emergency like a raft, whilst help is requested by wireless telegraph.

Without limiting the attention to such considerations, which may be taken into consideration in the future, one may suggest to fit the upper works of the ships (decks, spardecks) with devices which may be taken down or unhooked by means of a convenient arrangement and imagine a great number of salvage means which may be quickly thrown over board, such as life buoys, tubes, that cannot be submerged, rafts or raft portions floats provided with cylinders that cannot be submerged and connected together like the uprights of a ladder and the like.

As to the lower works, cofferdams and blocks near the ceiling could weaken the shocks.

The current meter of a metal tube of 50 centimeters diameter stuffed with waste may support 100 kilogrs.

A wooden cylinder having a 10 centimeter diameter surrounded by Melaleuca plates 20 centimeters thick and wrapped in fabric, may support 150 kilogrs.

Thus the Melaleuca cork is indicated for any salvage devices used at sea, including hydroplane floats, facings between the frame of the inner plane, the car of air ships and the like.

Melaleuca cork may give way to any kind of combinations for fishing floats of any class.

Its application as cork or stopper may be considered; however the usual cork seems to be preferable and more pertaining to practice for bottles; however its tightness (especially when compressed) may be utilized for closing vessels having a large neck.

Finally Melaleuca bark is an insulating or dielectric material.

The main and most important applications of the novel material have been pointed out in the above description; it is however understood that a further study may give ground to more applications; furthermore the Melaleuca tree may provide other substances, the profit of which lowers the working cost of the bark. Said substances having been studied upon the spot during seven years, the possibility of working them may be exposed.

Having now fully described my said invention, what I claim and desire to secure by Letters Patent, is:

1. An insulating medium made of the bark of *Melaleuca leucadendron*.

2. An electrical insulating medium made of the bark of *Melaleuca leucadendron*.

PAUL EMMANUEL HIPPOLYTE ROUSSAN.

Witnesses:
CLEMENT S. EDWARDS,
GEORGES DEBROUCK.